(12) United States Patent
Saliev (10) Patent No.: US 10,904,417 B1
(45) Date of Patent: Jan. 26, 2021

(54) INTERCHANGABLE DISPLAY SCREEN AND CAMERA SEGMENTS

(71) Applicant: INTERNATIONAL BUSINESS MACHINES CORPORATION, Armonk, NY (US)

(72) Inventor: Azizjon Saliev, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/541,549

(22) Filed: Aug. 15, 2019

(51) Int. Cl.
*H04N 5/225* (2006.01)
*G03B 17/48* (2006.01)
*H04N 5/235* (2006.01)
*H04N 7/14* (2006.01)
*H04M 1/02* (2006.01)
*G06F 1/16* (2006.01)

(52) U.S. Cl.
CPC .......... *H04N 5/2257* (2013.01); *G03B 17/48* (2013.01); *G06F 1/1605* (2013.01); *H04M 1/0264* (2013.01); *H04N 5/2251* (2013.01); *H04N 5/2351* (2013.01); *H04N 5/2354* (2013.01); *H04N 7/144* (2013.01)

(58) Field of Classification Search
None
See application file for complete search history.

(56) References Cited

U.S. PATENT DOCUMENTS

| 9,520,537 | B2 | 12/2016 | Bower | |
|---|---|---|---|---|
| 9,570,019 | B2 | 2/2017 | Musgrave | |
| 9,762,781 | B2 | 9/2017 | Evans | |
| 9,891,734 | B2 | 2/2018 | Al | |
| 10,284,697 | B2 | 5/2019 | Yin | |
| 2009/0036162 | A1 | 2/2009 | Hsu | |
| 2011/0281618 | A1* | 11/2011 | Chambers | H04N 5/2354 455/556.1 |
| 2014/0218587 | A1* | 8/2014 | Shah | H04N 17/002 348/340 |
| 2014/0364168 | A1* | 12/2014 | Galuszka | G06F 1/1686 455/556.1 |
| 2017/0084231 | A1 | 3/2017 | Chew | |

(Continued)

FOREIGN PATENT DOCUMENTS

| DE | 2020140101501 U1 | 4/2015 |
|---|---|---|
| KR | 2013009307 A | 8/2013 |
| WO | 2009153388 A1 | 12/2009 |

*Primary Examiner* — William B Perkey
(74) *Attorney, Agent, or Firm* — Tihon Poltavets (57) ABSTRACT

An apparatus includes an electronic device includes a glass overlay, a primary display screen, and an interchangeable segment mechanism, wherein a rear surface of the glass overlay is disposed over a top surface of the primary display screen of the electronic device. The interchangeable segment mechanism includes a body structure with a display screen segment and a secondary segment disposed inside a chamber within the electronic device, wherein the interchangeable segment mechanism is configured to rotate the body structure. A cavity defined by one or more sides of the primary display screen and a portion of the rear surface of the glass overlay, wherein the display screen segment of the body structure is placeable in the cavity by the interchangeable segment mechanism and the secondary segment of the body structure is placeable in the cavity by the interchangeable segment mechanism.

20 Claims, 8 Drawing Sheets

(56) References Cited

U.S. PATENT DOCUMENTS

| | | |
|---|---|---|
| 2018/0007182 A1 | 1/2018 | Lin |
| 2018/0260079 A1 | 9/2018 | Zhang |
| 2019/0064875 A1 | 2/2019 | Ahn |
| 2020/0274958 A1* | 8/2020 | Gong .................. H04M 1/0264 |
| 2020/0288003 A1* | 9/2020 | Zeng .................. H04M 1/0264 |

* cited by examiner

INTERCHANGABLE DISPLAY SCREEN AND CAMERA SEGMENTS

BACKGROUND OF THE INVENTION

This disclosure relates generally to electronic devices, and in particular, to interchangeable display screen and camera segments for electronic devices.

Presently, electronic devices (e.g., smart phones and tablet computers) utilize a large portion of a total frontal area for a display screen and manufactures have been striving to maximize the amount of total frontal area utilized by the display screen. However, cameras and sensors (e.g., light sensor) are typically required in the frontal area of the electronic device to perform one or more functions and manufactures have had to integrated these cameras and sensors into the frontal area of the electronic device, while maximizing the amount of total frontal area utilized by the display screen.

SUMMARY

One aspect of an embodiment of the present invention discloses an apparatus for an electronic device with an interchangeable segment mechanism, the apparatus comprising an electronic device includes a glass overlay, a primary display screen, and an interchangeable segment mechanism, wherein a rear surface of the glass overlay is disposed over a top surface of the primary display screen of the electronic device; the interchangeable segment mechanism includes a body structure with a display screen segment and a secondary segment disposed inside a chamber within the electronic device, wherein the interchangeable segment mechanism is configured to rotate the body structure; and a cavity defined by one or more sides of the primary display screen and a portion of the rear surface of the glass overlay, wherein the display screen segment of the body structure is placeable in the cavity by the interchangeable segment mechanism and the secondary segment of the body structure is placeable in the cavity by the interchangeable segment mechanism.

A second aspect of an embodiment of the present invention discloses a method for operating an interchangeable segment mechanism, the method comprising displaying, by one or more processors, content on a primary display screen and a display screen segment, wherein a portion of an item from the content is displayed on the primary display screen and a remaining portion of the item from the content is displayed on the display screen segment; responsive to receiving a request for a camera function on an electronic device, instructing, by one or more processors, an interchangeable segment mechanism to swap the display screen segment for a camera segment; altering, by one or more processors, the content to accommodate for the swapped display screen segment, wherein the item from the content is repositioned to another area on the primary display screen; displaying, by one or more processors, the altered content on the primary display screen; and responsive to a termination of the camera function on the electronic device, instructing, by one or more processors, the interchangeable segment mechanism to swap the camera segment for the display screen segment.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Embodiments of the present invention provide an electronic device with a primary display screen and an interchangeable segment mechanism for interchanging between a display screen segment and a secondary segment. The secondary segment can include a camera device, LEDs, and/or one or more sensors (e.g., light sensor). The interchangeable segment mechanism allows for a bezel-less and notch-free display screen on the electronic device, where the primary display screen combined with the display screen segment combined provide the bezel-less and notch-free display screen. A cavity in the primary display screen allows for the interchangeable segment mechanism to rotate a body that includes the display screen segment and the secondary screen segment, where either the display screen segment and the secondary screen segment is placeable within the cavity of the primary display screen depending on a function being performed by the electronic device.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1A:
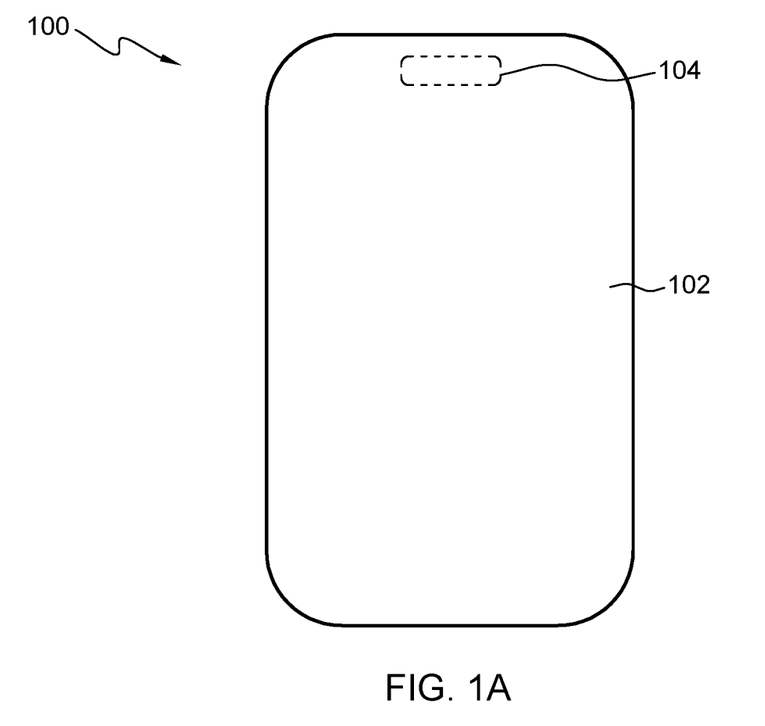
FIG. 1A depicts an interchangeable segment area in a frontal area of an electronic device, in accordance with an embodiment of the present invention.

FIG. 1A depicts an interchangeable segment area in a frontal area of an electronic device, in accordance with an embodiment of the present invention. In this embodiment, electronic device 100 is a smartphone with primary display screen 102 and display screen segment 104. Primary display screen 102 covers a frontal area of electronic device 100, where primary display screen 102 spans across electronic device 100 in an edge-to-edge manner in a latitudinal direction and a longitudinal direction. Display screen segment 104 is positioned in an interchangeable segment area in the frontal area of electronic device 100, where interchangeable segment mechanism 200 has the ability to switch out display screen segment 104 for camera segment 106, discussed in further detail with regards to FIG. 1D. In other embodiments, electronic device 100 can be a tablet computer, a smart watch, or any device with a frontal area that includes a display screen and one or more sensors and/or cameras.

Figure 1B:
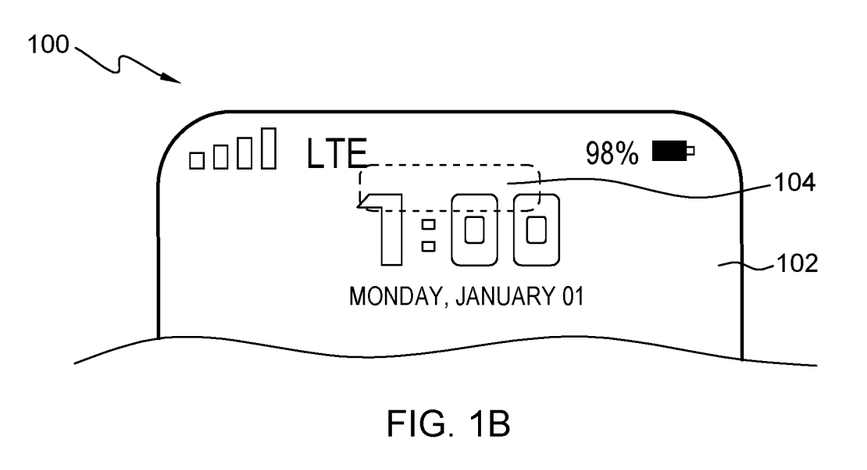
FIG. 1B depicts an enhanced view of the interchangeable segment area in the frontal area of on the electronic device displaying content, in accordance with an embodiment of the present invention.

FIG. 1B depicts an enhanced view of the interchangeable segment area in the frontal area of on the electronic device displaying content, in accordance with an embodiment of the present invention. Primary display screen 102 and display screen segment 104 display content on electronic device 100 in a continuous manner, where a first portion of an object is displayed in primary display screen 102 and a second portion (i.e., remaining portion) of the object is displayed in display screen segment 104. As a result, primary display screen 102 and display screen segment 104 combine to form a single operational display viewable by a user of electronic device 100. In this embodiment, electronic device 100 displays the time utilizing primary display screen 102 and display screen segment 104. Primary display screen 102 displays a lower portion of the numerical values for the time and display screen segment 104 displays an upper portion of the numerical values for the time. An edge of a perimeter of primary display screen 102 contacts an edge of a perimeter of display screen segment 104 to allow for content to be displayed in the continuous manner on electronic device 100. In other embodiment, a gap is present between a radius edge of a perimeter of primary display screen 102 and a radius edge of a perimeter of display screen segment 104. The radius edge of both primary display screen 102 and display screen segment 104 allows for a plurality of display pixels to be positioned on each of the radius edges to provide a perceived continuous display between primary display screen 102 and display screen segment 104. Content displayed utilizing the plurality of display pixels on each of the radius edges can be altered to provide the perceived continuous display across primary display screen 102 and display screen segment 104.

Figure 1C:
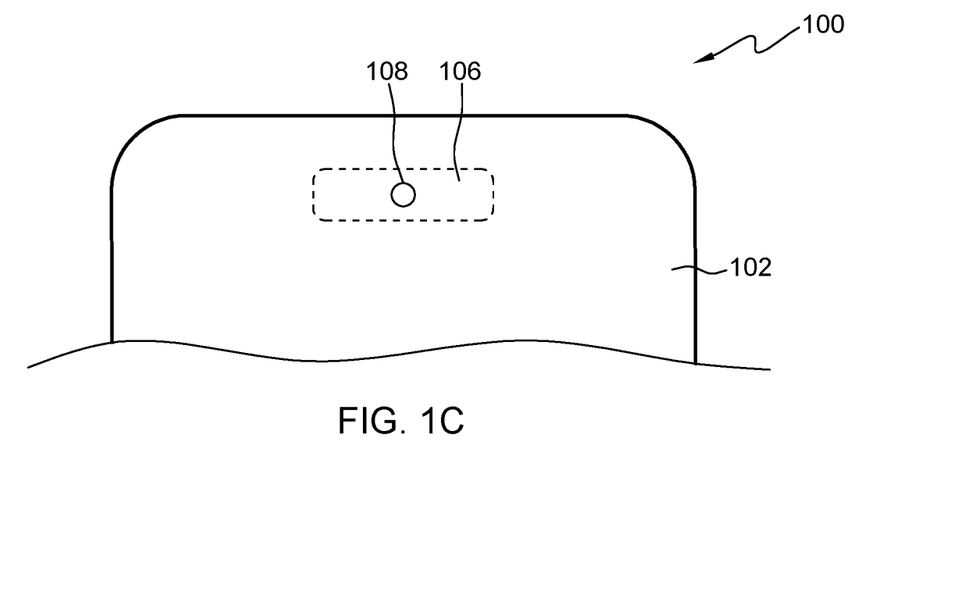
FIG. 1C depicts an enhanced view of the interchangeable segment area in the frontal area of on the electronic device displaying a camera, in accordance with an embodiment of the present invention.

FIG. 1C depicts an enhanced view of the interchangeable segment area in the frontal area of on the electronic device displaying a camera, in accordance with an embodiment of the present invention. Camera segment 106 with camera lens 108 is positioned in an interchangeable segment area in the frontal area of electronic device 100, where interchangeable segment mechanism 200 replaced display screen segment 104 with camera segment 106. In this embodiment, a front area of camera segment 106 surrounding camera lens 108 includes a surrounding screen segment display, to maximize an overall display area of the frontal area of electronic device 100. In another embodiment, display screen segment 104 has a radius edge equal to a radius edge of camera segment 106, where camera lens 108 does not have any surrounding screen segment display. The surrounding display screen segment 104 works in conjunction with primary display screen 102 to display content on electronic device 100. In another embodiment, camera segment 106 is configured with a camera flash (i.e., LED), alongside camera lens 108. In yet another embodiment, camera segment 106 includes camera lens 108 coupled to a backing plate without an additional surrounding screen segment display. Electronic device 100 adjusts content being displayed on primary display screen 102 to accommodate a configuration of camera segment 106 described above.

For camera segment 106 with a surrounding display screen segment 104 with camera lens 108, an edge of a perimeter of primary display screen 102 contacts an edge of a perimeter of camera segment 106 to allow for content to be displayed in the continuous manner on electronic device 100. In other embodiments, a gap is present between a radius edge of a perimeter of primary display screen 102 and a radius edge of a perimeter of camera segment 106. The radius edge of both primary display screen 102 and camera segment 106 allows for a plurality of display pixels to be positioned on each of the radius edges to provide a perceived continuous display between primary display screen 102 and camera segment 106. Content displayed utilizing the plurality of display pixels on each of the radius edges can be altered to provide the perceived continuous display across primary display screen 102 and camera segment 106.

Figure 1D:
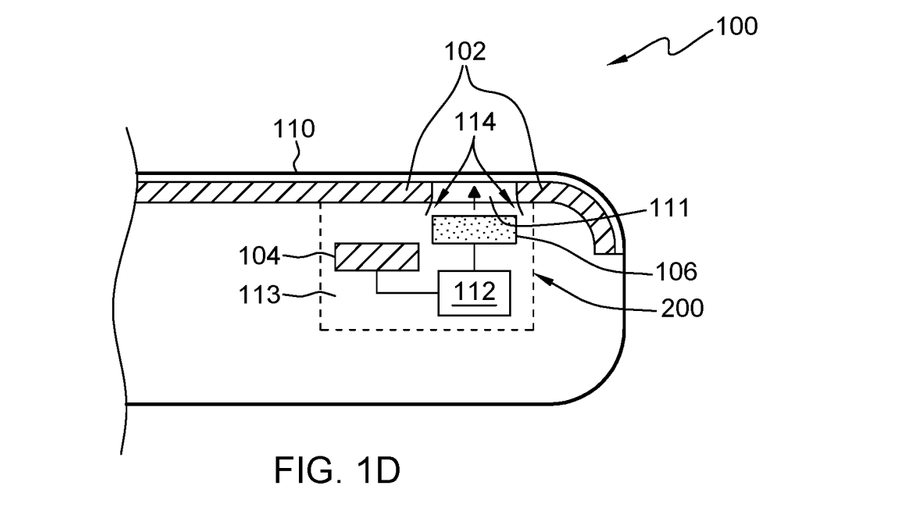
FIG. 1D depicts an enhanced cross-sectional view of an interchangeable segment mechanism disposed within the electronic device, in accordance with an embodiment of the present invention.

FIG. 1D depicts an enhanced cross-sectional view of an interchangeable segment mechanism disposed within the electronic device, in accordance with an embodiment of the present invention. Interchangeable segment mechanism 200 includes device 112 mechanically coupled to both display screen segment 104 and camera segment 106, to facilitate movement during a segment interchanging process. Device 112 can be a motor, a servomotor, an actuator, or any electrical component capable of facilitating movement of display screen segment 104 and camera segment 106. Device 112 is electrically coupled to a power source (e.g., battery cell) of electronic device 100, where a computer processing unit (CPU) or integrated circuit (IC) controls movements of interchangeable segment mechanism 200 via device 112. Glass overlay 110 is disposed over primary display screen 102 and cavity 111, where interchangeable segment mechanism 200 positions display screen segment 104 or camera segment 106 against a rear portion of glass overlay 110 in cavity 111. A front portion of glass overlay 110 faces a user operating electronic device 100. Glass overlay 110 is any transparent medium capable of passing light generated by the plurality of pixels of primary display screen 102 and display screen segment 104

Interchangeable segment mechanism 200 is positioned in chamber 113, where chamber 113 is hermetically sealed to prevent containments from affecting the operations of interchangeable segment mechanism 200. Furthermore, the hermetically sealed chamber 113 prevents containments (e.g., dust particles) from being positioned between the rear portion of glass overlay 110 and a top viewable portion of display screen segment 104 or camera segment 106. In one embodiment, interchangeable segment mechanism 200 can be mechanically and/or electrically coupled to a printed circuit board (PCB) utilizing surface-mount technology (SMT), where a combination of one or more walls of chamber 113, a rear portion of glass overlay 110, a top surface of the PCB, and a rear portion of primary display screen 102 form the bounds of the hermetically sealed chamber 113. Guides 114 along an edge of primary display screen 102 surround at least a portion of cavity 111, where guides 114 assist interchangeable segment mechanism 200 in guiding segment display 104 or camera segment 106 into cavity 111.

Figure 1E:
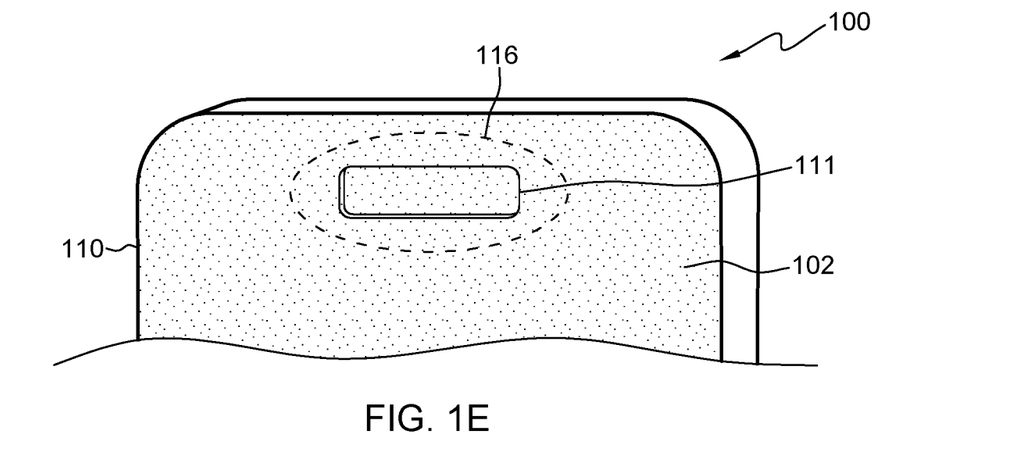
FIG. 1E depicts an enhanced view of the interchangeable segment area in the frontal area of on the electronic device with a glass overlay, in accordance with an embodiment of the present invention.

FIG. 1E depicts an enhanced view of the interchangeable segment area in the frontal area of on the electronic device with a glass overlay, in accordance with an embodiment of the present invention. Continuing the discussion of the embodiment from FIG. 1D, a front portion of glass overlay 110 faces a user operating electronic device 100, where glass overlay 110 is disposed over primary display screen 102 and cavity 111. Frontal area 116 highlights that glass overlay 110 extends over cavity 111, while disposed on a top surface of primary display screen 102.

Figure 1F:
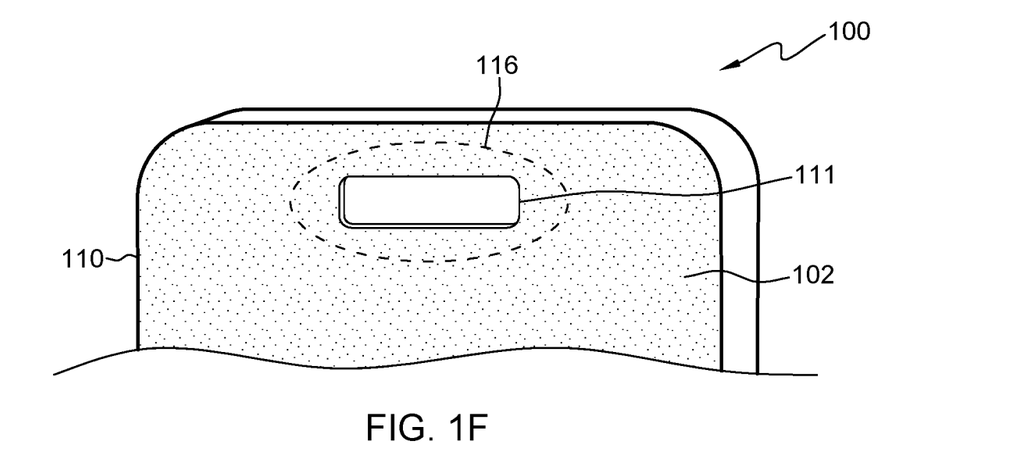
FIG. 1F depicts an enhanced view of the interchangeable segment area in the frontal area of on the electronic device without a glass overlay, in accordance with an embodiment of the present invention.

FIG. 1F depicts an enhanced view of the interchangeable segment area in the frontal area of on the electronic device without a glass overlay, in accordance with an embodiment of the present invention. In this embodiment, a front portion of glass overlay 110 faces a user operating electronic device 100, where glass overlay 110 is disposed over primary display screen 102 and includes an aperture in frontal area 116 for cavity 111. The aperture of glass overlay 110 in frontal area 116 allows for either display screen segment 104 or camera segment 106 to extend beyond a planar surface of the front portion of glass overlay 110. In one example, a planar surface of a top portion of display screen segment 104 aligns with the planar surface of the front portion of glass overlay 110. A planar surface of a top portion of camera segment 106 aligns with the planar surface of the front portion of glass overlay 110, but a planar surface of a top portion of a camera lens 108 positioned on the camera segment 106 aligns extends beyond the planar surface of the front portion of glass overlay 110. The aperture of glass overlay 110 in frontal area 116 accommodates camera lens 108 positioned on camera segment 106, since camera lens 108 extends beyond the planar surface of the front portion of glass overlay 110.

Figure 2A:
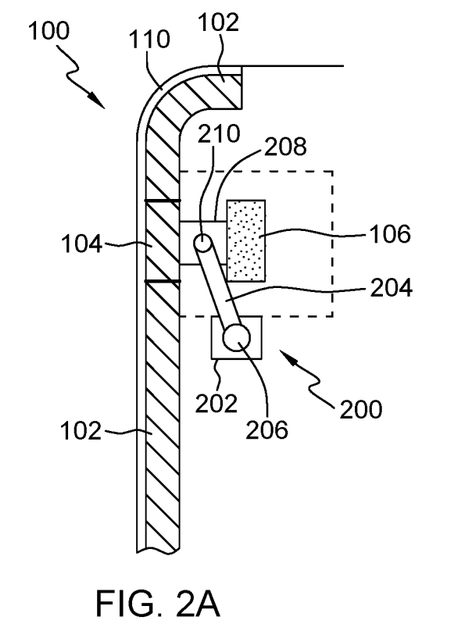
FIG. 2A depicts an interchangeable segment mechanism in a display segment state, in accordance with an embodiment of the present invention.

FIG. 2A depicts an interchangeable segment mechanism in a display segment state, in accordance with an embodiment of the present invention. In this embodiment, electronic device 100 initializes a segment interchanging process, where electronic device 100 is in a display segment state. The display segment state represents electronic device 100 displaying content across primary display screen 102 and display screen segment 104. A planar surface of a top portion of display screen segment 104 at least partially aligns with a planar surface of a top portion of primary display screen 102. Glass overlay 110 is disposed on top of primary display screen 102 and interchangeable segment mechanism 200 presses the top portion of display screen segment 104 against a rear portion of glass overlay 110. Interchangeable segment mechanism 200 includes motor 202 mechanically coupled to a first end of arm 204 at joint 206, where the first end of arm 204 is rotatable at joint 206 based on a mechanical input by motor 202. Body 208 is mechanically coupled to a second end of arm 204 at joint 210, where the second end of arm 204 is rotatable at joint 210 based on a mechanical input by motor 202 or a secondary motor housed within body 208 (not illustrated in FIG. 2A). Body 206 includes display screen segment 104 and camera segment 106 positioned such that when body 206 rotates, a top portion of either display screen segment 104 or camera segment 106 faces a rear portion of glass overlay 110.

Figure 2B:
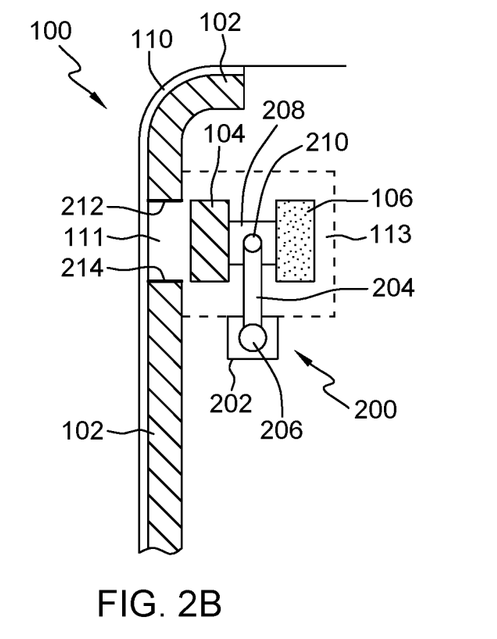
FIG. 2B depicts the interchangeable segment mechanism in a retracted state, in accordance with an embodiment of the present invention.

FIG. 2B depicts the interchangeable segment mechanism in a retracted state, in accordance with an embodiment of the present invention. During the segment interchanging process, interchangeable segment mechanism 200 retracts body 208 into chamber 113 during the retracted state. Motor 202 rotates arm 204 at joint 206 in a clockwise manner, where a degree of clockwise rotation by motor 202 is dependent on a configuration and clearance required to subsequently rotate body 208 in chamber 113. Body 208 rotates about joint 210 in a counterclockwise manner to counteract the clockwise rotation at joint 206 to maintain a leveled position of body 208 along a latitudinal line, as interchange segment mechanism 200 extracts display screen segment 104 from cavity 111. Cavity 111 can include a friction reducing coating or film (e.g., near-frictionless carbon film) on surface 212 and 214, where either display screen segment 104 or camera segment 106 contacts a side of primary display screen 102. In some embodiments, surface 212 and/or surface 214 can be concave or convex shaped to provide clearance for interchangeable segment mechanism 200 to insert display screen segment 104 or camera segment 106 into cavity 111.

Figure 2C:
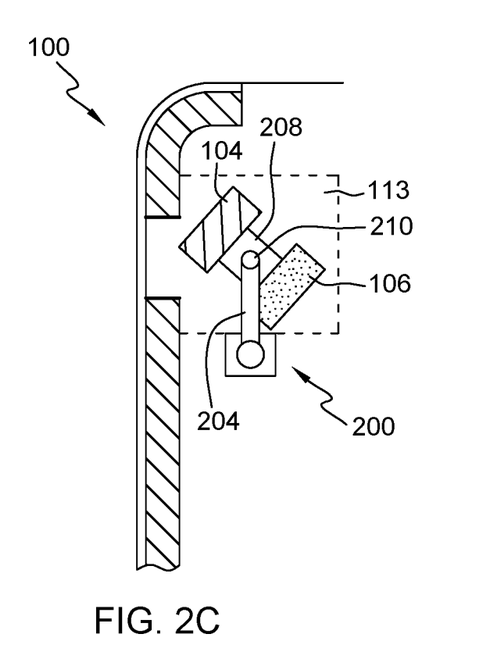
FIG. 2C depicts the interchangeable segment mechanism in a rotational state, in accordance with an embodiment of the present invention.

FIG. 2C depicts the interchangeable segment mechanism in a rotational state, in accordance with an embodiment of the present invention. During the segment interchanging process, interchangeable segment mechanism 200 rotates body 208 in chamber 113 during a rotational state in order to interchange display screen segment 104 with camera segment 106. In this embodiment, body 208 rotates about joint 210 in a clockwise manner in chamber 113, where neither screen display screen segment 104 or camera segment 106 contact the interior boundaries of chamber 113. Arm 204 is positioned adjacent to body 208 such that arm 204 does not interfere with a rotational movement of body 208 during the rotational state. In other embodiment, body 208 rotates about joint 210 in a counterclockwise manner in chamber 113 depending on a configuration of motor 202 and/or a secondary motor housed within body 208.

Figure 2D:
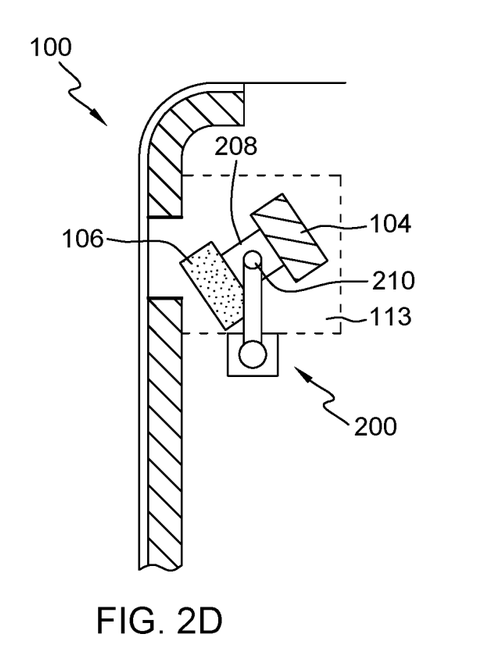
FIG. 2D depicts another view of the interchangeable segment mechanism in the rotational state of FIG. 2C, in accordance with an embodiment of the present invention.

FIG. 2D depicts another view of the interchangeable segment mechanism in the rotational state of FIG. 2C, in accordance with an embodiment of the present invention. Interchangeable segment mechanism 200 continues rotating body 208 in chamber 113 during the rotational state in order to interchange display screen segment 104 with camera segment 106. Based on the configuration of body 208 with display screen segment 104 and camera segment 106, body 208 rotates 180 degrees at joint 210 to perform a complete interchangement between display screen segment 104 and camera segment 106.

Figure 2E:
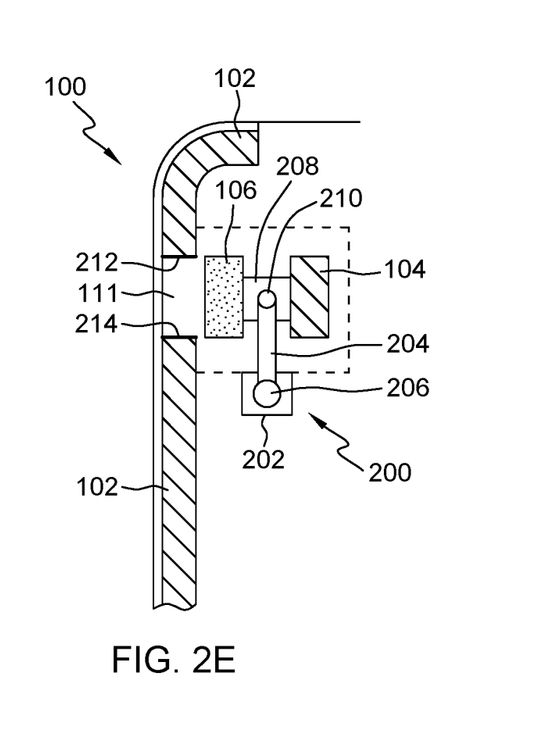
FIG. 2E depicts another view of the interchangeable segment mechanism in the retracted state, in accordance with an embodiment of the present invention.

FIG. 2E depicts another view of the interchangeable segment mechanism in the retracted state, in accordance with an embodiment of the present invention. During the retracted state subsequent to the rotational state, interchangeable segment mechanism 200 aligns camera segment 106 on body 208 for insertion into cavity 111. For inserting camera segment 106 into cavity 111, motor 202 rotates arm 204 at joint 206 in a counterclockwise manner, where a degree of counterclockwise rotation by motor 202 is dependent on an amount of clearance between camera segment 106 and the sides of primary display screen 102. Body 208 rotates about joint 210 in a clockwise manner to counteract the counterclockwise rotation at joint 206 to maintain a leveled position of body 208 along a latitudinal line, as interchange segment mechanism 200 inserts camera segment 106 into cavity 111. As previously mentioned, cavity 111 can include a friction reducing coating or film (e.g., near-frictionless carbon film) on surface 212 and 214, where either display screen segment 104 or camera segment 106 contacts a side of primary display screen 102.

Figure 2F:
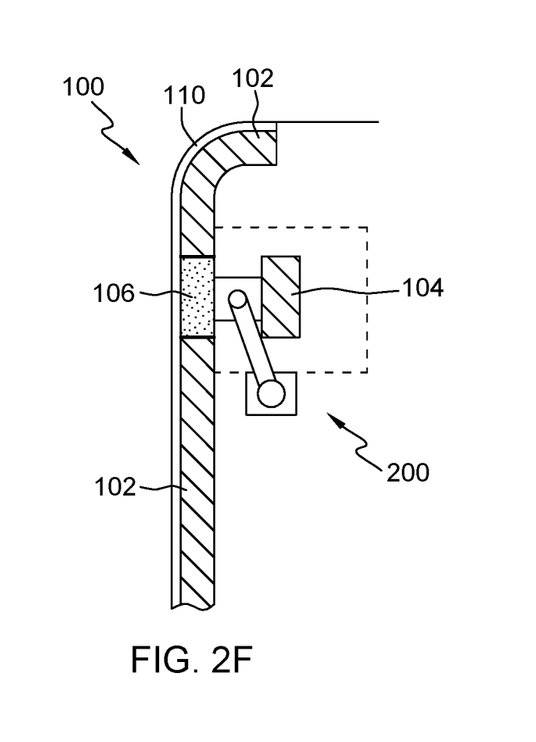
FIG. 2F depicts an interchangeable segment mechanism in a camera segment state, in accordance with an embodiment of the present invention.

FIG. 2F depicts an interchangeable segment mechanism in a camera segment state, in accordance with an embodiment of the present invention. The camera segment state represents electronic device 100 displaying content across primary display screen 102 with an active camera segment 106, where electronic device 100 modifies the displayed content to accommodate the no longer present display screen segment 104. A planar surface of a top portion of camera segment 106 at least partially aligns with a planar surface of a top portion of primary display screen 102. Glass overlay 110 is disposed on top of primary display screen 102 and interchangeable segment mechanism 200 presses the top portion of camera segment 106 against a rear portion of glass overlay 110. In another embodiment, glass overlay 110 includes an aperture as previously discussed in FIG. 1F, where camera lens 108 of camera segment 106 extends beyond (i.e., protrudes) a planar surface of the top portion of glass overlay 110. In yet another embodiment, glass overlay 110 includes an aperture as previously discussed in FIG. 1F, where camera segment 106 includes a portion of glass overlay. A planar surface of the top portion of glass overlay on camera segment 106 aligns with a planar surface of the top portion of glass overlay 110, where the portion of glass overlay of camera segment 106 is disposed over camera lens 108.

Figure 3A:
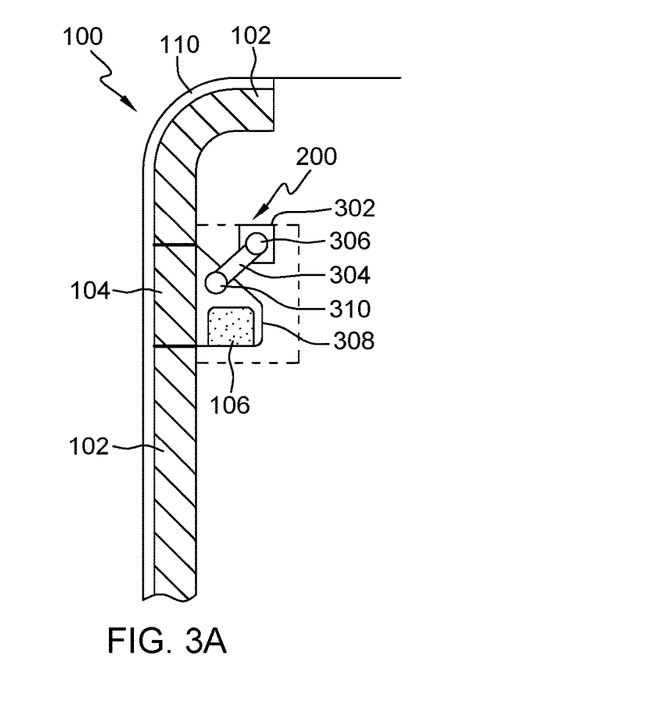
FIG. 3A depicts an interchangeable segment mechanism in a display segment state, in accordance with an embodiment of the present invention.

FIG. 3A depicts an interchangeable segment mechanism in a display segment state, in accordance with an embodiment of the present invention. In this embodiment, electronic device 100 initializes a segment interchanging process, where electronic device 100 is in a display segment state. The display segment state represents electronic device 100 displaying content across primary display screen 102 and display screen segment 104. A planar surface of a top portion of display screen segment 104 at least partially aligns with a planar surface of a top portion of primary display screen 102. Glass overlay 110 is disposed on top of primary display screen 102 and interchangeable segment mechanism 200 presses the top portion of display screen segment 104 against a rear portion of glass overlay 110. Interchangeable segment mechanism 200 includes motor 302 mechanically coupled to a first end of adjustable arm 304 at joint 306, where the first end of adjustable arm 304 is rotatable at joint 306 based on a mechanical input by motor 302. Body 308 is mechanically coupled to a second end of adjustable arm 304 at joint 310, where the second end of adjustable arm 304 is rotatable at joint 310 based on a mechanical input by motor 302 or a secondary motor housed within body 308 (not illustrated in FIG. 3A). Adjustable arm 304 has the ability to extend and retract in a linear manner in a direction parallel to the length of adjustable arm 304. Body 306 includes display screen segment 104 and camera segment 106 positioned such that when body 306 rotates, a top portion of either display screen segment 104 or camera segment 106 faces a rear portion of glass overlay 110.

Figure 3B:
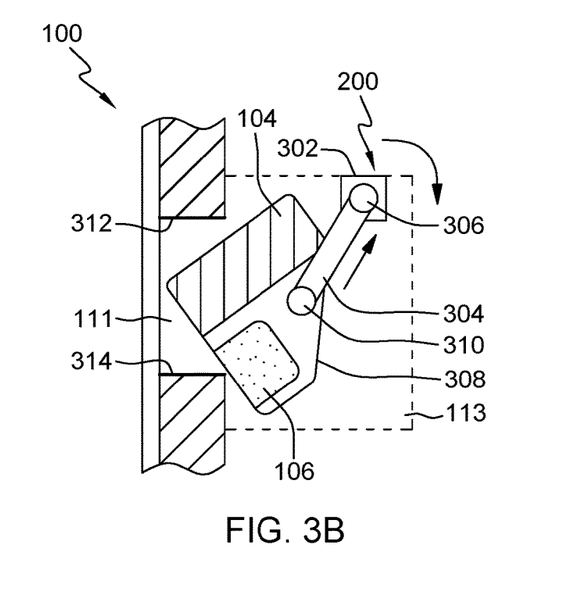
FIG. 3B depicts an interchangeable segment mechanism in a rotational state, in accordance with an embodiment of the present invention.

FIG. 3B depicts an interchangeable segment mechanism in a rotational state, in accordance with an embodiment of the present invention. During the segment interchanging process, interchangeable segment mechanism 200 rotates body 308 in chamber 113 during a rotational state in order to interchange display screen segment 104 with camera segment 106. Motor 302 rotates arm 304 at joint 306 in a counterclockwise manner, where a degree of counterclockwise rotation by motor 302 is dependent on a configuration and clearance required to subsequently rotate body 308 in chamber 113. Body 308 rotates about joint 310 in a clockwise manner in chamber 113, where neither display screen segment 104 or camera segment 106 contact the interior boundaries of chamber 113. Adjustable arm 304 is positioned adjacent to body 308 such that adjustable arm 304 does not interfere with a rotational movement of body 308 during the rotational state. Adjustable arm 304 retracts during the rotational movement of body 308, to allow for body 308 to clear the sides and edges of primary display screen 102. Adjustable arm 304 retracting allows for an overall length of adjustable arm 304 to decrease, while ensuring rotational clearance for body 308 within chamber 113.

For inserting camera segment 106 into cavity 111, motor 302 rotates arm 304 at joint 306 in a clockwise manner, where a degree of clockwise rotation by motor 302 is dependent on an amount of clearance between camera segment 106 and the sides of primary display screen 102. Body 308 rotates about joint 210 in a clockwise manner at joint 206 and as interchange segment mechanism 200 inserts camera segment 106 into cavity 111, adjustable arm 304 extends (i.e., increase length) to allow for latitudinal movement of body 308. Cavity 111 can include a friction reducing coating or film (e.g., near-frictionless carbon film) on surface 312 and 314, where either display screen segment 104 or camera segment 106 contacts a side of primary display screen 102.

Figure 3C:
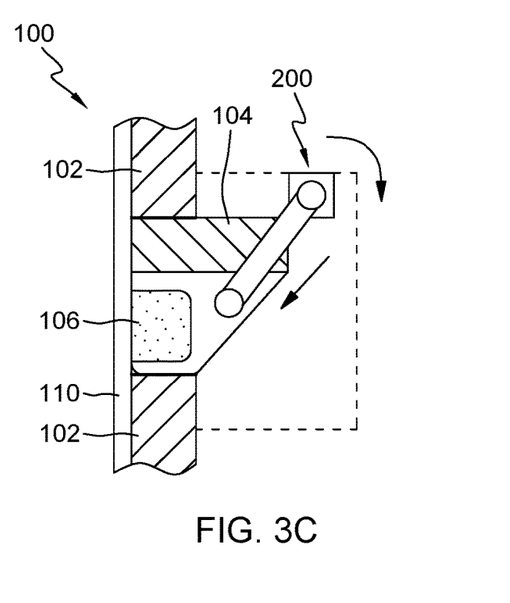
FIG. 3C depicts an interchangeable segment mechanism in a camera segment state, in accordance with an embodiment of the present invention.

FIG. 3C depicts an interchangeable segment mechanism in a camera segment state, in accordance with an embodiment of the present invention. The camera segment state represents electronic device 100 displaying content across primary display screen 102 with an active camera segment 106, where electronic device 100 modifies the displayed content to accommodate the no longer present display screen segment 104. A planar surface of a top portion of camera segment 106 at least partially aligns with a planar surface of a top portion of primary display screen 102. Glass overlay 110 is disposed on top of primary display screen 102 and interchangeable segment mechanism 200 presses the top portion of camera segment 106 against a rear portion of glass overlay 110. In another embodiment, glass overlay 110 includes an aperture as previously discussed in FIG. 1F, where camera lens 108 of camera segment 106 extends beyond (i.e., protrudes) a planar surface of the top portion of glass overlay 110. In yet another embodiment, glass overlay 110 includes an aperture as previously discussed in FIG. 1F, where camera segment 106 includes a portion of glass overlay. A planar surface of the top portion of glass overlay on camera segment 106 aligns with a planar surface of the top portion of glass overlay 110, where the portion of glass overlay of camera segment 106 is disposed over camera lens 108.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 4:
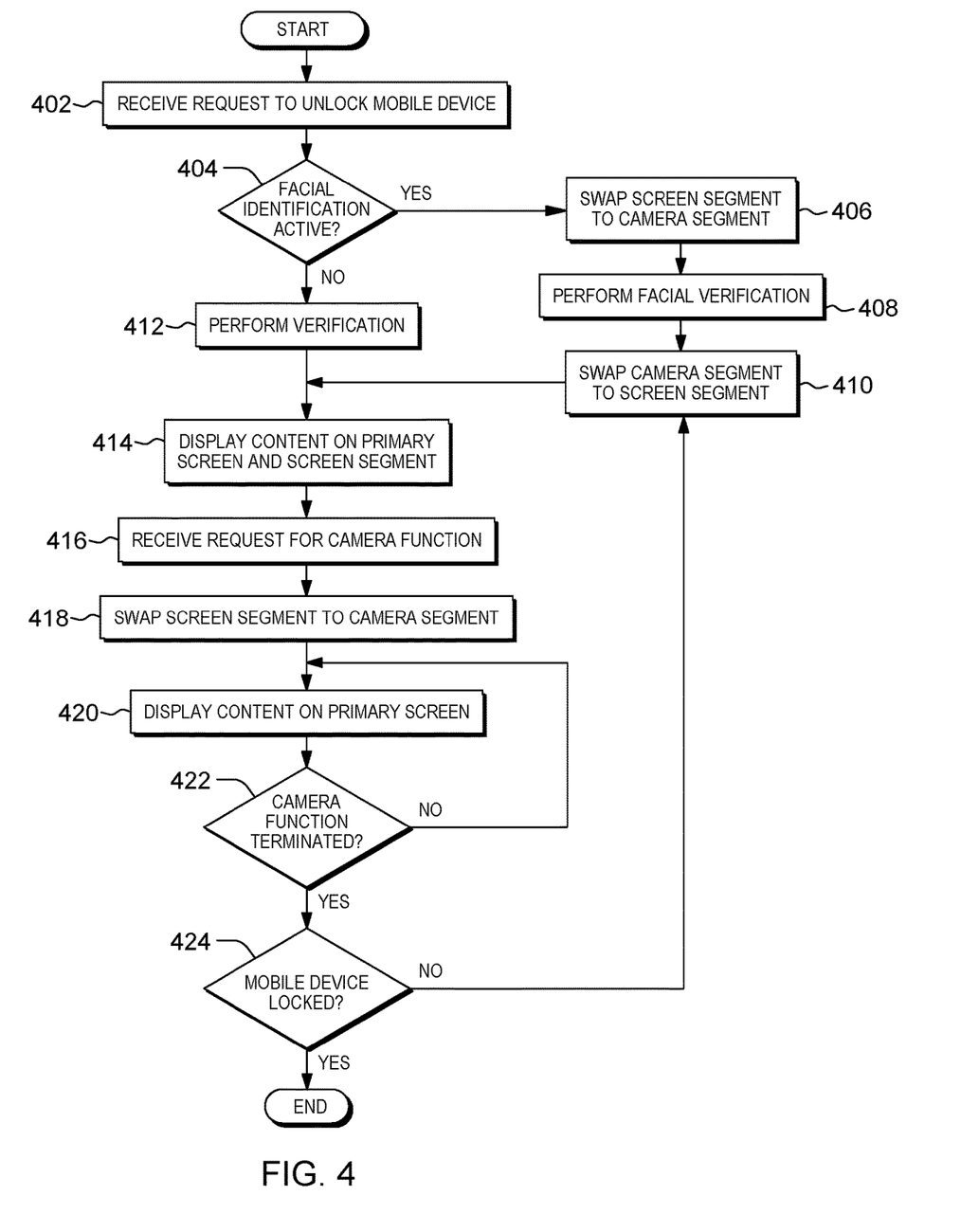
FIG. 4 is a flowchart depicting a plurality of instructions for operating the interchangeable segment mechanism, in accordance with one embodiment of the present invention.

FIG. 4 is a flowchart depicting a plurality of instructions for operating the interchangeable segment mechanism, in accordance with one embodiment of the present invention.

In this embodiment, the plurality of instructions for operating the interchangeable segment mechanism are integrated into one or more features of a mobile on which interchangeable segment mechanism is present. The one or more processors performing the plurality of instructions are integrated into the mobile device. For example, a mobile device with an integrated facial recognition software operated by the one or more processors can provide one or more instructions to the interchange segment mechanism on swapping (i.e., interchanging) between a display screen segment and a camera segment. The one or more processors can also provide instructions on how to display content on a display screen segment of the interchange segment mechanism depending on a type of application operating on the mobile device.

One or more processors receives (402) a request to unlock a mobile device. In this embodiment, the mobile device represent an electronic device with an interchangeable segment mechanism, wherein the mobile device can be a smartphone, a tablet computer, or a wearable device. The one or more processors for controlling the interchangeable segment mechanism receives the request to unlock the mobile device and activates a primary display screen and a screen segment display. One or more processors determines (404) whether facial identification is active on the mobile device. In the event one or more processors determines that facial identification is active on the mobile device ("yes" branch, 404), one or more processors swaps (406) the screen segment to the camera segment. In the event that one or more processors determines that facial identification is not active on the mobile device ("no" branch, 404), one or more processors performs (412) a verification utilizing another form of a verification process.

One or more processors swaps (406) the screen segment to the camera segment. The one or more processors swaps the screen segment to the camera segment by instructing interchangeable segment mechanism to interchange between a display screen segment to a camera segment. Subsequent to one or more processors performing (408) a facial verification of the user operating the mobile device, one or more processors swaps (410) the camera segment to the screen segment. The one or more processors swaps the camera segment to the screen segment by instructing interchangeable segment mechanism to interchange between a camera segment to a screen segment screen.

One or more processors performs (412) a verification. In this embodiment, one or more processors performs a verification utilizing another form of a verification process different from a facial verification. In one example, one or more processors displays a keypad across the primary display screen and the display screen segment for entering a unique pin for verification of the user attempting to access the contents of the mobile device.

One or more processors displays (414) content on a primary screen and the screen segment. The one or more processors displays content on the primary display screen and the display screen segment to maximum a total display area of the mobile device. In this embodiment, a gap is present between a radius edge of a perimeter of the primary display screen and a radius edge of a perimeter of the display screen segment. The radius edge of both the primary display screen and the display screen segment allows for a plurality of display pixels to be positioned on each of the radius edges to provide a perceived continuous display between the primary display screen and the screen segment display. The one or more processors displays the content altering color and brightness of each of the plurality of display pixels on each of the radius edges to provide the perceived continuous display across the primary display screen and the screen segment display.

One or more processors receives (416) a request for a camera function and the one or more processors swaps (418) the screen segment to the camera segment. The one or more processors swaps the screen segment to the camera segment by instructing interchangeable segment mechanism to interchange between a display screen segment to a camera segment. One or more processors displays (420) content on the primary screen. The one or more processors alters the content to accommodate for the display screen segment that is no longer present due to camera segment being present. For example, the one or more processors can reposition an item of content and/or alter a shape or size of the item of content to ensure the item is properly displayed on primary display screen. By repositioning an item, the one or more processors relocates the item of content to another area on the viewable area on the primary display screen.

One or more processors determines (422) whether the camera function has been terminated. In the event one or more processors determines the camera function has been terminated ("yes" branch, 422), one or more processors determines (424) whether the mobile device has been locked. In the event one or more processors determines the camera function has not been terminated ("no" branch, 404), one or more processors continues display (420) content on the primary screen.

One or more processors determines (424) whether the mobile device has been locked. In the event one or more processors determines the mobile device has not been locked ("no" branch, 424), one or more processors swaps (410) the camera segment to the screen segment. In the event one or more processors determines the mobile device has been locked ("yes" branch, 424), one or more processors ceases operations of the interchangeable segment mechanism. Alternatively, one or more processors can swap the camera segment to the screen segment and subsequently cease operations of the interchangeable segment mechanism.

Figure 5:
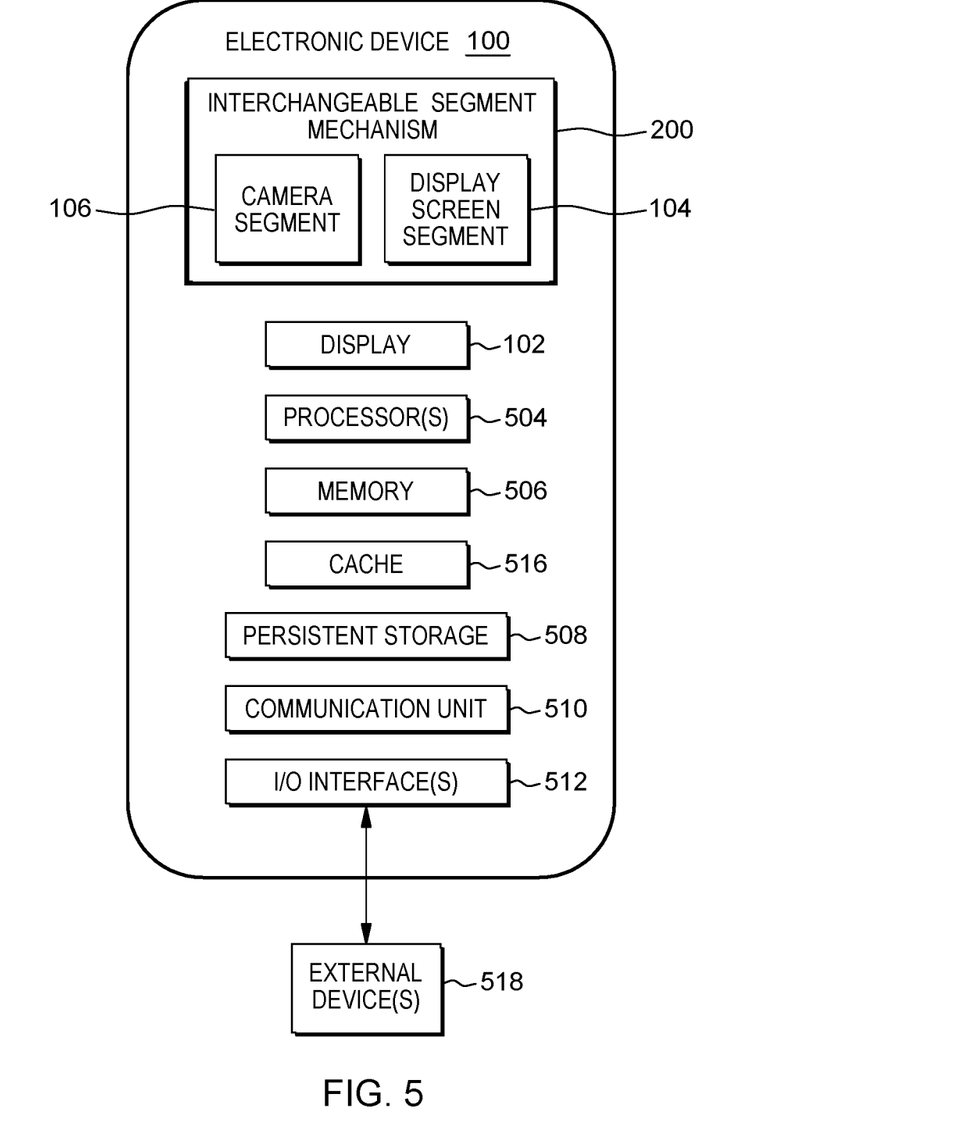
FIG. 5 depicts a block diagram of components of an electronic device for performing the plurality of instructions, in an embodiment, in accordance with the present invention.

FIG. 5 depicts a block diagram of components of an electronic device for performing the plurality of instructions, in an embodiment, in accordance with the present invention. Electronic device 100 includes interchangeable segment mechanism 200, where interchangeable segment mechanism 200 interchanges between display screen segment 104 and camera segment 106. The plurality of instructions for operating interchangeable segment mechanism 200 are stored on processors 504. Electronic device 100 includes processors 504, cache 516, memory 506, persistent storage 508, communications unit 510, input/output (I/O) interface(s) 512 and a communications fabric. The communications fabric provides communications between cache 516, memory 506, persistent storage 508, communications unit 510, and input/output (I/O) interface(s) 512. The communications fabric can be implemented with any architecture designed for passing data and/or control information between processors (such as microprocessors, communications and network processors, etc.), system memory, peripheral devices, and any other hardware components within a system. For example, the communications fabric can be implemented with one or more buses or a crossbar switch.

Memory 506 and persistent storage 508 are computer readable storage media. In this embodiment, memory 502 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 506 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Primary display 102 provides a mechanism to display data to a user of electronic device 100. As previously discussed, primary display screen 102 and display screen segment 104 can display data and content on electronic device 100 in a continuous manner, where a first portion of an object is displayed in primary display screen 102 and a second portion (i.e., remaining portion) of the object is displayed in display screen segment 104

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for an electronic device with an interchangeable segment mechanism, the apparatus comprising:
an electronic device includes a glass overlay, a primary display screen, and an interchangeable segment mechanism, wherein a rear surface of the glass overlay is disposed over a top surface of the primary display screen of the electronic device;
the interchangeable segment mechanism includes a body structure with a display screen segment and a secondary segment disposed inside a chamber within the electronic device, wherein the interchangeable segment mechanism is configured to rotate the body structure; and
a cavity defined by one or more sides of the primary display screen and a portion of the rear surface of the glass overlay, wherein the display screen segment of the body structure is placeable in the cavity by the interchangeable segment mechanism and the secondary segment of the body structure is placeable in the cavity by the interchangeable segment mechanism.

2. The apparatus of claim 1, wherein the secondary segment is a camera segment with a camera lens.

3. The apparatus of claim 2, the further comprising:
a motor mechanically coupled to a first end of an arm, wherein the motor facilitates rotation of the first end of the arm at a first joint; and
a second end of the arm mechanically coupled to the body structure, wherein the body structure is rotatable at a second joint between the second end of the arm and the body structure.

4. The apparatus of claim 3, wherein the motor mechanically coupled to the first end of the arm facilitates a rotation at the second joint between the second end of the arm and the body structure.

5. The apparatus of claim 3, further comprising:
a secondary motor positioned within the body structure facilities a rotation at the second joint between the second end of the arm and the body structure.

6. The apparatus of claim 2, wherein the chamber within the electronic device is defined by at least the portion of the rear surface of the glass overlay, the one or more sides of the primary display screen, a portion of a rear surface of the primary display, and a printed circuit board.

7. The apparatus of claim 6, wherein the chamber is hermetically sealed.

8. The apparatus of claim 2, wherein the display screen segment is placeable in the cavity by the interchangeable segment mechanism such that a top surface of the display screen segment faces the portion of the rear surface of the glass overlay.

9. The apparatus of claim 2, wherein the camera segment is placeable in the cavity by the interchangeable segment mechanism such that a top surface of the camera segment faces the portion of the rear surface of the glass overlay.

10. The apparatus of claim 2, wherein each of the one or more sides of the primary display screen includes a guide along an edge to facilitate the interchangeable segment mechanism in guiding either the display screen segment or the secondary segment of the body structure into the cavity.

11. The apparatus of claim 2, wherein the one or more sides of the primary display screen includes one or more of a friction reducing coating and a friction reducing film.

12. The apparatus of claim 8, further comprising:
a radius edge of the top surface of the display screen segment facing the portion of the rear surface of the glass overlay includes a plurality of display pixels.

13. An apparatus for an electronic device with an interchangeable segment mechanism, the apparatus comprising:
an electronic device includes a glass overlay, a primary display screen, and an interchangeable segment mechanism, wherein a rear surface of the glass overlay is disposed over a top surface of the primary display screen of the electronic device;
the interchangeable segment mechanism includes a body structure with a display screen segment and a secondary segment disposed inside a chamber within the electronic device, wherein the interchangeable segment mechanism is configured to rotate the body structure; and
a first cavity defined by one or more sides of the primary display screen aligns with a second cavity in the glass overlay, wherein the display screen segment of the body structure is placeable in the first cavity and the second cavity by the interchangeable segment mechanism and the secondary segment of the body structure is placeable in the first cavity and the second cavity by the interchangeable segment mechanism.

14. The apparatus of claim 13, further comprising:
a first glass overlay portion disposed over a top surface of the display screen segment, wherein a planar surface of the first glass overlay portion aligns with a planar surface of the top surface of the primary display screen when the display screen segment of the body structure is placed in the first cavity and the second cavity by the interchangeable segment mechanism.

15. The apparatus of claim 14, further comprising:
a second glass overlay portion disposed over a top surface of the secondary segment, wherein a planar surface of the second glass overlay portion aligns with the planar surface of the top surface of the primary display screen when the secondary segment of the body structure is placed in the first cavity and the second cavity by the interchangeable segment mechanism.

16. The apparatus of claim 15, wherein the secondary segment is a camera segment with a camera lens.

17. The apparatus of claim 16, wherein each of the one or more sides of the primary display screen includes a guide along an edge to facilitate the interchangeable segment mechanism in guiding either the display screen segment or the secondary segment of the body structure into the cavity.

18. The apparatus of claim 17, wherein the one or more sides of the primary display screen includes one or more of a friction reducing coating and a friction reducing film.

19. The apparatus of claim 18, further comprising:
a radius edge of the top surface of the display screen segment includes a plurality of display pixels.

20. A method comprising:
displaying, by one or more processors, content on a primary display screen and a display screen segment, wherein a portion of an item from the content is displayed on the primary display screen and a remaining portion of the item from the content is displayed on the display screen segment;
responsive to receiving a request for a camera function on an electronic device, instructing, by one or more processors, an interchangeable segment mechanism to swap the display screen segment for a camera segment;
altering, by one or more processors, the content to accommodate for the swapped display screen segment, wherein the item from the content is repositioned to another area on the primary display screen;
displaying, by one or more processors, the altered content on the primary display screen; and
responsive to a termination of the camera function on the electronic device, instructing, by one or more processors, the interchangeable segment mechanism to swap the camera segment for the display screen segment.

* * * * *